US010315899B2

(12) United States Patent
Smit et al.

(10) Patent No.: US 10,315,899 B2
(45) Date of Patent: Jun. 11, 2019

(54) METHOD AND TRANSPORT DEVICE FOR TRANSPORTING A CONTAINER OR PALLET WITH AIR CARGO

(71) Applicants: Aerofilm Systems B.V., Eindhoven (NL); Elisabeth Maria Klaver, Heemstede (NL)

(72) Inventors: Arnold Jan Nicolaas Raymond M. Smit, Heemstede (NL); Michael Ernst Cohen, Amstelveen (NL)

(73) Assignee: Aerofilm Systems B. V., Eindhoven (NL)

( * ) Notice: Subject to any disclaimer, the term of this patent is extended or adjusted under 35 U.S.C. 154(b) by 0 days.

(21) Appl. No.: 15/742,758

(22) PCT Filed: Jul. 7, 2016

(86) PCT No.: PCT/EP2016/066173
§ 371 (c)(1),
(2) Date: Jan. 8, 2018

(87) PCT Pub. No.: WO2017/005869
PCT Pub. Date: Jan. 12, 2017

(65) Prior Publication Data
US 2018/0201491 A1 Jul. 19, 2018

(30) Foreign Application Priority Data
Jul. 9, 2015 (NL) ...................................... 2015126

(51) Int. Cl.
*B62B 3/00* (2006.01)
*B66F 9/075* (2006.01)
(Continued)

(52) U.S. Cl.
CPC ........ *B66F 9/07577* (2013.01); *B62B 3/0618* (2013.01); *B66F 9/183* (2013.01); *F16C 32/0614* (2013.01)

(58) Field of Classification Search
CPC ... B62B 3/0625; B62B 5/0083; B62B 5/0089; B66F 7/085; B66F 9/065
See application file for complete search history.

(56) References Cited

U.S. PATENT DOCUMENTS 2,592,091 A * 4/1952 Weaver ............... B60L 11/1877
104/247
3,159,380 A * 12/1964 Du Broff .............. B62B 3/0625
254/8 C
(Continued)

FOREIGN PATENT DOCUMENTS

DE 10108736 9/2002
EP 0508447 10/1992
WO WO-8705888 10/1987

*Primary Examiner* — Bryan A Evans
(74) *Attorney, Agent, or Firm* — Marcus C. Dawes

(57) ABSTRACT

Method for transporting a container or pallet with cargo, wherein at least one transport device is used comprising a frame consisting of an elongate central member (11) and carrying beams (12), each carrying beam (12) extending perpendicular to the central member (11) in the same direction from a different end of the central member (11) thus forming a generally U-shaped frame, wherein in use said U-shaped frame extends in a generally horizontal orientation, said carrying beams being arranged to engage and carry a bottom part of a container or a pallet, wherein the bottom side of said frame is provided with a plurality of air bearings (13) arranged to lift said frame with said cargo from a flat floor surface, wherein a container or pallet to be transported is moved into or out of a vehicle at an transshipment location, wherein for transporting said container or pallet in or out of said vehicle said container or pallet is engaged and (Continued)

lifted by said at least one transport device by activating said air bearings (13), wherein said transport device is moved in and/or out of said vehicle while said air bearings (13) are activated, and wherein said transport device is disengaged from said container or pallet by deactivating said air bearings (13).

19 Claims, 4 Drawing Sheets

(51) Int. Cl.
  *B62B 3/06*   (2006.01)
  *B66F 9/18*   (2006.01)
  *F16C 32/06*  (2006.01)

(56) References Cited

U.S. PATENT DOCUMENTS

| | | |
|---|---|---|
| 4,440,253 A | 4/1984 | Pernum |
| 4,470,578 A | 9/1984 | Arvidsson |
| 2009/0279994 A1* | 11/2009 | Gramatikov .......... B62B 3/0618 414/685 |

\* cited by examiner

METHOD AND TRANSPORT DEVICE FOR TRANSPORTING A CONTAINER OR PALLET WITH AIR CARGO

The invention relates to a method for transporting a container or pallet with cargo. Although the invention is described in relation to air cargo, the invention may also be used for other modes of transport, such as trains, trucks and ships.

In aircraft cargo transport standard containers and pallets are increasingly used. The most often used standard containers and pallets have floor dimensions of 317.5 cm in length and between 150 and 244 cm in width, or smaller pallets having floor dimensions of 120 cm in length and 80 cm in width. Also in smaller aircraft cargo are replaced by airline containers. During the transport and transfer of the containers, at suppliers, at an airport and within aircraft, there are a number of transfer occasions. The containers have to be transferred from storage space to trucks and vice versa, from trucks to aircrafts and vice versa, and have to be moved within the plane. On well developed airports complex and costly infrastructure is installed, usually using a ball conveyor floor or roller conveyor floor. Inside an aircraft a cargo loading system is common. For an aircraft a cargo loading system involves an adjustment to the aircraft (which need to be certified by the aviation authorities), and the aircraft always flies with the weight of the cargo loading system, which increases fuel consumption and reduces capacity. The invention aims to reduce these drawbacks.

To that end the invention provides a method for transporting a container or pallet with air cargo, wherein at least one transport device is used comprising a frame consisting of an elongate central member and carrying beams, each carrying beam extending perpendicular to the central member in the same direction from a different end of the central member thus forming a generally U-shaped frame, wherein in use said U-shaped frame extends in a generally horizontal orientation, said carrying beams being arranged to engage and carry a bottom part of a container or a pallet, wherein the bottom side of said frame is provided with a plurality of air bearings arranged to lift said frame with said cargo from a flat floor surface, wherein a container or pallet to be transported is moved into or out of an airplane (or other vehicle) at an airport (or other transshipment location), and wherein for transporting said container or pallet in or out of said airplane said container or pallet is engaged and lifted by said at least one transport device by activating said air bearings, wherein said transport device is moved in and/or out of said airplane while said air bearings are activated, and wherein said transport device is disengaged from said container or pallet by deactivating said air bearings.

In a preferred embodiment said container or pallet to be transported is moved into said airplane at a first airport, wherein said airplane transports said container or pallet to a second airport, wherein said container or pallet is moved out of said airplane, wherein either for moving said container or pallet into said airplane or moving said container out of said airplane one of said transport devices is used. In a further preferred embodiment both for moving said container or pallet into said airplane and moving said container out of said airplane one of said transport devices is used. In a still further preferred embodiment, after moving said container or pallet into said airplane, said one of at least one transport device is carried from the first to the second airport in the same airplane and used to move said container or pallet out of said airplane.

The invention also relates to a transport device for moving a container or pallet with air cargo, comprising a frame consisting of an elongate central member and carrying beams, each carrying beam extending perpendicular to the central member in the same direction from a different end of the central member thus forming a generally U-shaped frame, wherein in use said U-shaped frame extends in a generally horizontal orientation, said carrying beams being arranged to engage and carry a bottom part of a container or a pallet, wherein the bottom side of said frame is provided with a plurality of air bearings arranged to lift said frame with said cargo from a flat floor surface.

Preferably said frame is provided with inwardly movable engaging members on said carrying beams arranged to engage said bottom part of said container or said pallet when said bottom part of said container or said pallet extends between said carrying beams. Preferably said engaging members are engaged to clamp the bottom part of said container or said pallet. Preferably said frame comprises at least four of said engaging members, one near each end of a carrying beam. Preferably said engaging members have a generally L-shape, such that the lower horizontal plate shaped part of the L-shaped engaging members can be inwardly moved under the sides of the container or pallet, and the vertical flat inwardly facing surfaces of the L-shaped engaging members can be inwardly pushed against the lower sides of the container or against the pallet. Preferably a switch is provided on the transport device such that when the transport device is moved against the container or pallet, the switch activates the inwardly movable engaging members on said carrying beams to engage said bottom part of said container or said pallet.

Preferably said frame is provided with a plurality of wheels, which allow the frame to roll over a flat floor surface. Preferably said wheels are retractable into the frame, such that in the retracted position of the wheels the frame is prevented from rolling over a flat floor surface. Preferably said frame comprises at least four of said air bearings, one near each end of a carrying beam. Preferably said frame comprises at least four of said wheels, one near each end of a carrying beam. Preferably the wheels near the ends of the carrying beams on the central member side are caster wheels. Preferably the wheels near the ends of the carrying beams opposite the central member side are fixed to drive in the direction perpendicular to the central member.

Preferably paid device is provided with at least one compressor or air pump for providing compressed air to said air bearings. Preferably the central part of said frame is provided with a push bar arranged to be engaged by the hands of an operator for manipulating the device. Preferably said push bar extends parallel to the central member at a height of between 1 m and 1.8 m above the bottom side of the frame, such that an operator can engage it by the hands while standing on the floor. Preferably the distance between said carrying beams is between 0.8 m and 1.2 m (for smaller pallets) or 1.6 and 3.3 m.

The invention reduces tare weight of the aircraft and operational costs, causes reduced pressure on the aircraft floor and the bottom of the container, containers are easier to maneuver in all directions (back/forth and sideways), and are easy to transfer to other modes of transport. The device of the invention can be used and manufactured for all sizes of containers and pallets, requires little space and lifting height during transport and can be used in many ways. For example, a device may be stationed at an airport or landing strip, or may be always carried in an aircraft or a truck. The energy for the device can be supplied from the airplane, in the form of electricity or using an existing pneumatic or hydraulic system, or (in the preferred embodiment) a portable compressor or air pump.

The invention will further be described by means of the preferred embodiment, as shown in the figures, wherein.

Figure 1:
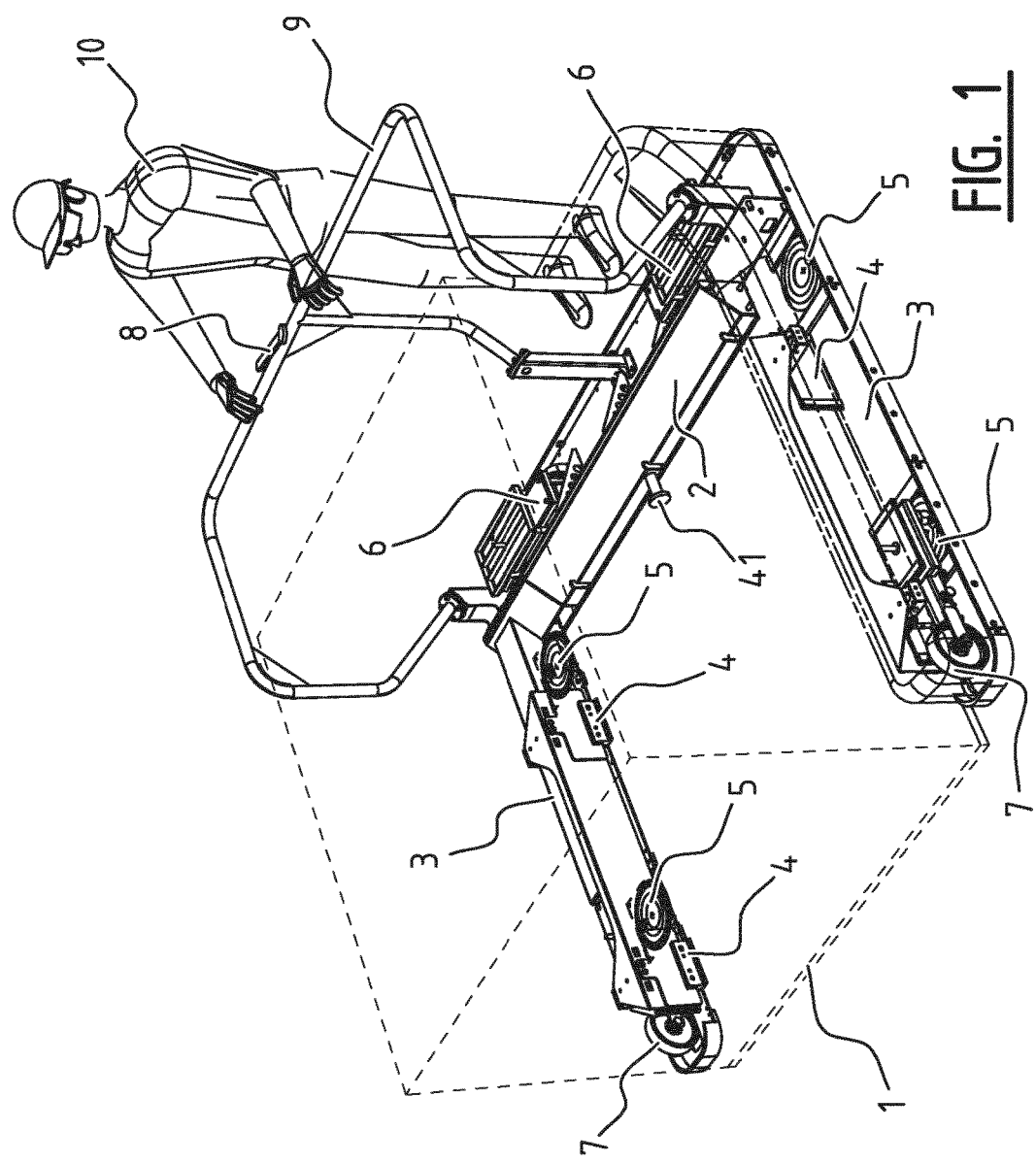
FIG. 1 is a perspective view of the transport device for moving a container or pallet with air cargo.
Figure 2:
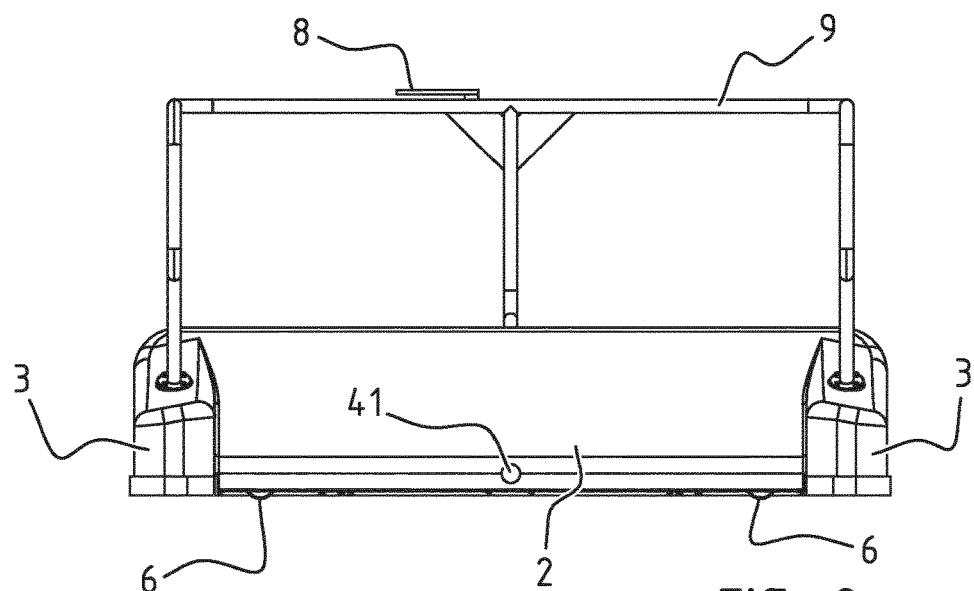
FIG. 2 is a front view of the transport device.
Figure 3:
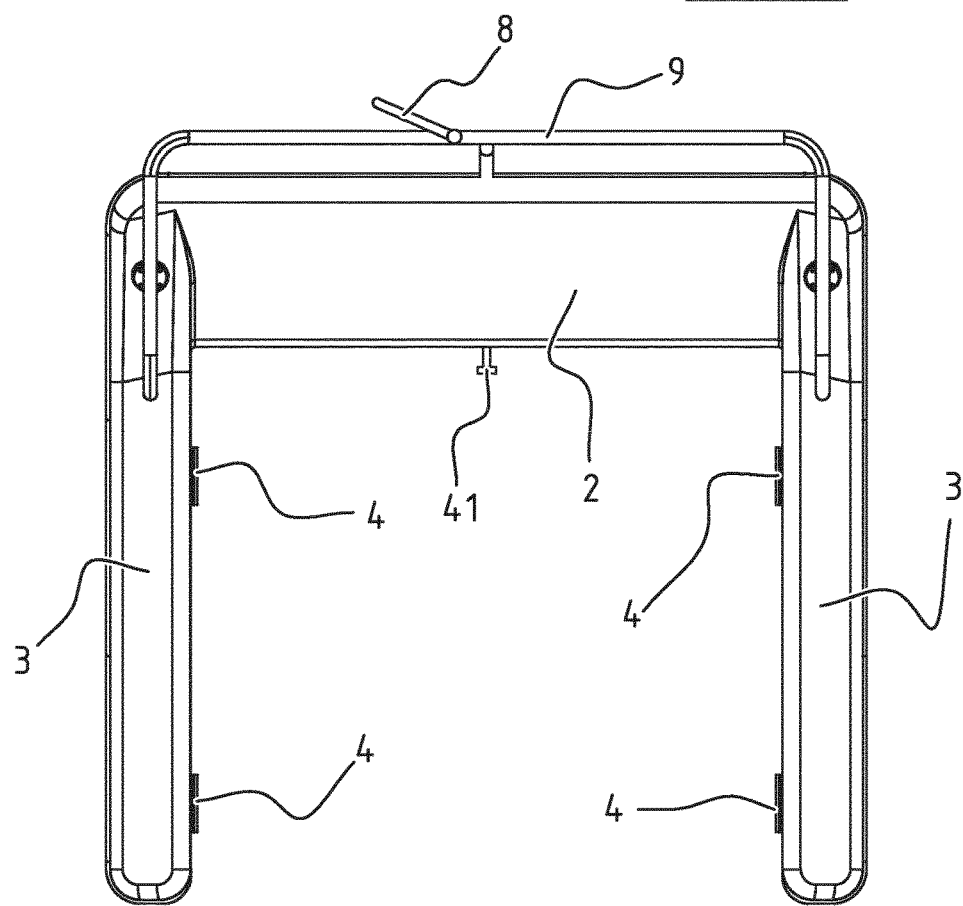
FIG. 3 is a top view of the transport device.
Figure 4:
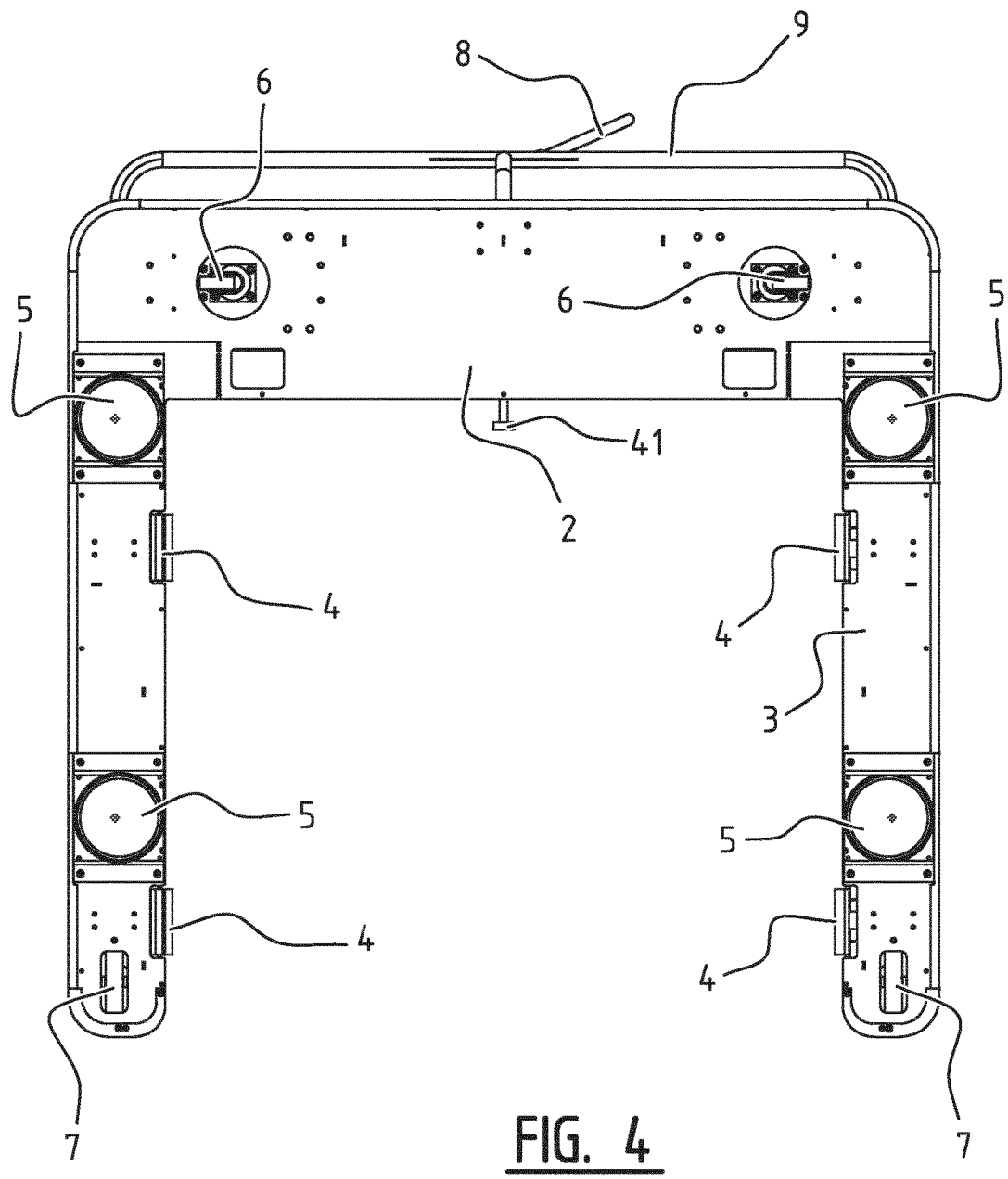
FIG. 4 is a bottom view of the transport device.

According to the figures the transport device for moving a container or pallet with air cargo 1 comprises an elongate central member 2 and carrying beams 3. The carrying beams 3 extend perpendicular to the central member 2 in the same direction from different ends of the central member 2, forming a U-shaped frame. Four inwardly engaging members 4 are provided on the inwardly facing sides of the carrying beams 3, one near each end of a carrying beam 3, to engage and clamp a bottom part of a container or a pallet 1 between the carrying beams 3. The engaging member 4 have a generally L-shape, such that the lower horizontal plate shaped part of the L-shaped engaging members can be inwardly moved by a pneumatic actuator under the sides of the container or pallet in order to be able push it upwards, and the vertical flat inwardly facing surfaces of the L-shaped engaging members can be inwardly pushed by said actuator against the lower sides of the container or against the pallet in order to clamp it between them. The distance between the carrying beams 3 is such that standard containers or pallets 1 can be engaged between them. A mechanical push switch 41 is provided on the central member 2 such that when the transport device is moved against the container or pallet, the switch 41 pneumatically activates the pneumatic actuators.

The bottom side of the frame is provided with air bearings 5, one near each end of a carrying beam 3, arranged to lift said frame together with said cargo 1 from the flat floor surface, such that the device with the cargo 1 can be moved over flat surfaces in and out of an airplane. The air bearings 5 are of the type that can lift the device approximately 25 or 30 mm.

Figure 5:
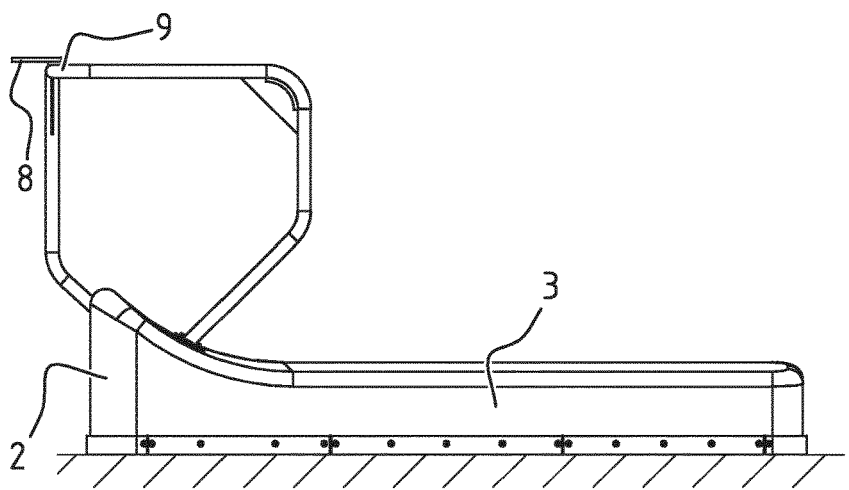
FIGS. 5, 6 and 7 are side views of the transport device.
Figure 6:
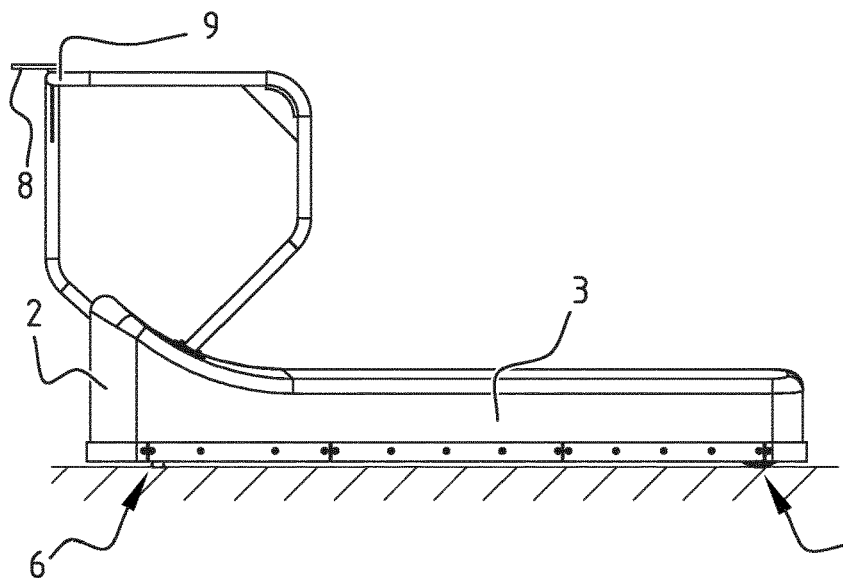
Figure 7:
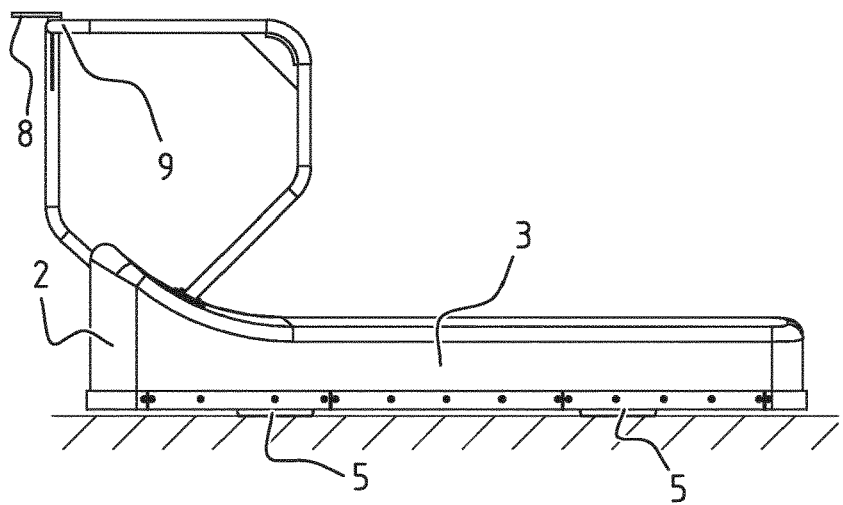

The frame is furthermore provided with wheels 6, 7, one near each end of a carrying beam 3, which allow the frame to roll over a flat floor surface and be moved when the device is not used for carrying cargo, as shown in FIG. 6. The wheels 6, 7 are retractable and extendible by a pneumatic actuator in the frame, such that in the retracted position of the wheels 6, 7 the frame is prevented from rolling away, as shown in FIG. 5. The wheels 6 near the ends of the carrying beams on the central member side are caster wheels, and the wheels 7 near the ends of the carrying beams opposite the central member side are fixed to drive in the forward/backward direction.

A separate movable air pump 8 (not shown) is provided for providing compressed air to the air bearings 5 and the pneumatic actuators. Furthermore a push bar 9 is arranged on the central member 2 to be engaged by the hands of one or more operators 10 for manipulating the device. The push bar 9 extends parallel to the central member 2 at a sufficient height, such that an operator 10 can engage it by the hands while standing on the floor, as shown in FIG. 1. A control handle 8 is provided on the push bar for activating the air bearings 5.

The device is thus operated entirely by the supply of compressed air, without any need for electronic components of the device for its operation.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. Method for transporting a container or pallet with cargo comprising:

extending a U-shaped frame of at least one transport device in a horizontal direction;

engaging a plurality of carrying beams of the at least one transport device to carry a bottom part of a container or a pallet; and moving the container or pallet into or out of a vehicle at a transshipment location, wherein the at least one transport device comprises a frame comprising an elongate central member and the carrying beams, each carrying beam extending perpendicular to the central member in the same direction from a different end of the central member thus forming the U-shaped frame, wherein the bottom side of said frame is provided with a plurality of air bearings arranged to lift said frame with said cargo from a flat floor surface, wherein moving the container or pallet in or out of said vehicle comprises engaging and lifting the container or pallet by activating said air bearings, wherein said transport device is moved in and/or out of said vehicle while said air bearings are activated, and wherein said transport device is disengaged from said container or pallet by deactivating said air bearings, and wherein engaging a plurality of carrying beams of the at least one transport device to carry a bottom part of a container or a pallet comprises engaging a plurality of inwardly movable engaging members on said plurality of carrying beams with said bottom part of said container or said pallet when said bottom part of said container or said pallet extends between said carrying beams.

2. Method according to claim 1, wherein moving said container or pallet into or out of a vehicle at a transshipment location comprises:

moving the container or pallet into said vehicle at a first transshipment location;

transporting said vehicle to a second transshipment location; and moving said container or pallet out of said vehicle.

3. Method according to claim 2, wherein, after moving said container or pallet into said vehicle at a first transshipment location, carrying the at least one transport device from the first to the second transshipment location in the same vehicle used to move said container or pallet.

4. Transport device for moving a container or pallet loaded with cargo, comprising a frame comprising of an elongate central member and plurality of carrying beams, each carrying beam extending perpendicular to the central member in the same direction from a different end of the central member thus forming a generally U-shaped frame, wherein in use said U-shaped frame extends in a generally horizontal orientation, said carrying beams being arranged to engage and carry a bottom part of a container or a pallet, wherein the bottom side of said frame is provided with a plurality of air bearings arranged to lift said frame with said cargo from a flat floor surface, and wherein said frame further comprises a plurality of inwardly movable engaging members on said carrying beams arranged to engage said bottom part of said container or said pallet when said bottom part of said container or said pallet extends between said carrying beams.

5. Device according to claim 4, wherein said engaging members are arranged to clamp the bottom part of said container or said pallet.

6. Device according to claim 4, wherein said engaging members have an L-shape, such that the lower horizontal plate shaped part of the L-shaped engaging members can be inwardly moved under the sides of the container or pallet, and the vertical flat inwardly facing surfaces of the L-shaped engaging members can be inwardly pushed against the lower sides of the container or against the pallet.

7. Device according to claim 4, wherein said frame comprises at least four of said engaging members, one near each end of a carrying beam.

8. Device according to claim 4, wherein said frame is furthermore provided with a plurality of wheels, which allow the frame to roll over a flat floor surface.

9. Device according to claim 8, wherein said frame comprises at least four of said wheels, one near each end of a carrying beam.

10. Device according to claim 8, wherein said wheels are retractable into the frame, such that in the retracted position of the wheels the frame is prevented from rolling over a flat floor surface.

11. Device according to claim 8, wherein the wheels near the ends of the carrying beams on the central member side are caster wheels.

12. Device according to claim 8, wherein the wheels near the ends of the carrying beams opposite the central member side are fixed to drive in the direction perpendicular to the central member.

13. Device according to claim 4, further comprising a switch provided on the transport device such that when the transport device is moved against the container or pallet, the switch activates the inwardly movable engaging members on said carrying beams to engage said bottom part of said container or said pallet.

14. Device according to claim 4, wherein said frame comprises at least four of said air bearings, one near each end of a carrying beam.

15. Device according to claim 4, further comprising at least one compressor or air pump for providing compressed air to said air bearings.

16. Device according to claim 4, wherein the central part of said frame is provided with a push bar arranged to be engaged by the hands of an operator for manipulating the device.

17. Device according to claim 16, wherein said push bar extends parallel to the central member at a height of between 1 m and 1.8 m above the bottom side of the frame, such that an operator can engage it by the hands while standing on the floor.

18. Device according to claim 4, any of the previous claims, wherein the distance between said carrying beams is between 0.8 m and 3.3 m.

19. Device according to claim 4, wherein said vehicle is an aircraft and said transshipment location is an airport.

* * * * *